(12) United States Patent
Akbulut et al.

(10) Patent No.: US 10,305,294 B2
(45) Date of Patent: May 28, 2019

(54) COMMUNICATION BETWEEN DEVICES TO DETERMINE PRIORITY OF CHARGING

(71) Applicant: INTERNATIONAL BUSINESS MACHINES CORPORATION, Armonk, NY (US)

(72) Inventors: Muhtar B. Akbulut, Waban, MA (US); Lisa Bradley, Cary, NC (US); Andrew Lavery, Austin, TX (US); Mario A. Maldari, Lyons, CO (US); Brian O'Donovan, Dublin (IE); Aaron J. Quirk, Cary, NC (US); Lin Sun, Morrisville, NC (US); Albert Tabachnik, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 251 days.

(21) Appl. No.: 14/872,873

(22) Filed: Oct. 1, 2015

(65) Prior Publication Data

US 2017/0098941 A1    Apr. 6, 2017

(51) Int. Cl.
*H02J 7/00* (2006.01)
*B60L 11/18* (2006.01)
*G06F 1/26* (2006.01)

(52) U.S. Cl.
CPC ......... *H02J 7/0021* (2013.01); *B60L 11/1809* (2013.01); *G06F 1/26* (2013.01); *H02J 7/0013* (2013.01); *H02J 7/0027* (2013.01); *H02J 2007/0096* (2013.01)

(58) Field of Classification Search
CPC ..................................................... Y02E 60/12

USPC ......................................................... 320/106
See application file for complete search history.

(56) References Cited

U.S. PATENT DOCUMENTS

| | | | |
|---|---|---|---|
| 7,860,223 B2 * | 12/2010 | Bradley | G06Q 10/109 379/88.12 |
| 8,090,415 B2 | 1/2012 | Annambhotla | |
| 8,179,102 B2 * | 5/2012 | Alberth, Jr. | H02J 7/0013 320/103 |
| 8,373,386 B2 | 2/2013 | Baarman et al. | |
| 8,965,754 B2 * | 2/2015 | Jones | G06F 17/276 704/10 |
| 2005/0174091 A1 * | 8/2005 | Dayan | H02J 7/0027 320/128 |
| 2010/0151918 A1 * | 6/2010 | Annambhotla | G01R 31/3648 455/573 |

(Continued)

FOREIGN PATENT DOCUMENTS

| | | |
|---|---|---|
| WO | 2010118161 | 10/2010 |
| WO | 2011118673 | 9/2011 |

*Primary Examiner* — Yalkew Fantu
(74) *Attorney, Agent, or Firm* — Tutunjian & Bitetto, P.C.; Richard Wilhelm (57) ABSTRACT

A method and system are provided. The method includes monitoring power usage and predicting power requirements for the at least two mobile devices. The method further includes identifying a device charging order and a power threshold of each of the at least two devices to meet the predicted power requirements of each of the at least two devices. The method also includes notifying a user regarding the device charging order and the power threshold of each of the at least two devices. At least the monitoring, identifying, and notifying steps are performed by a processor-enabled charging manager.

20 Claims, 8 Drawing Sheets

(56) References Cited

U.S. PATENT DOCUMENTS

| | | | |
|---|---|---|---|
| 2011/0320828 A1 | 12/2011 | Boss et al. | |
| 2013/0026972 A1* | 1/2013 | Luke | G07F 17/12 320/106 |
| 2013/0260677 A1 | 10/2013 | Partovi | |
| 2013/0346516 A1* | 12/2013 | Chen | H04L 51/26 709/206 |
| 2014/0008990 A1* | 1/2014 | Yoon | H02J 5/005 307/104 |
| 2014/0035379 A1 | 2/2014 | Stevens et al. | |

* cited by examiner

COMMUNICATION BETWEEN DEVICES TO DETERMINE PRIORITY OF CHARGING

BACKGROUND

Technical Field

The present invention relates generally to charging electronic devices and, in particular, to communication between devices to determine priority of charging.

Description of the Related Art

Charging mobile devices can be a time consuming process and typically has little optimization applied. There is no consideration made for charging the lowest battery state first or applying a priority charge to the device that is using the most power by virtue of power settings or running applications.

Phones/tablets currently can provide you with a warning indication when you are at a certain percent of battery life left or when your battery is full, but there is no intelligence for the phone to tell you when you have enough power to get you through to the next time you will be able to charge your phone/tablet.

Thus, there is a need for communication between devices to determine priority of charging.

SUMMARY

According to an aspect of the present principles, a method is provided. The method includes monitoring power usage and predicting power requirements for at least two mobile devices. The method further includes identifying a device charging order and a power threshold of each of the at least two devices to meet the predicted power requirements of each of the at least two devices. The method also includes notifying a user regarding the device charging order and the power threshold of each of the at least two devices. At least the monitoring, identifying, and notifying steps are performed by a processor-enabled charging manager.

According to another aspect of the present principles, a system is provided. The system includes a processor-enabled charging manager for monitoring power usage and predicting power requirements for at least two mobile devices, and identifying a device charging order and a power threshold of each of the at least two devices to meet the predicted power requirements of each of the at least two devices. A user is notified regarding the device charging order and the power threshold of each of the at least two devices.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to communication between mobile devices to determine priority of charging. The mobile devices can be any of phones, tablets, laptops, media players, portable game systems, and so forth.

In an embodiment, priority is applied to the charging of mobile devices based on various factors. Thus, in the case of a chain of stores (e.g., Starbucks®) offering wireless charging in their (coffee) shops, if the stores are limited in charging "bandwidth", they would not want to waste charging on a phone or tablet that is at 97% of full battery capacity opposed to one that is at 5% of full battery capacity. In such a scenario, the present principles advantageously allow for a prioritized charge system.

In an embodiment, the present principles enable communication between devices to make sure they all have at least the minimum amount of battery needed until the next time they can be charged.

In an embodiment, all the devices that need to be charged communicate so that they can have at the least the minimum amount of battery charge needed until the next time they need to be charged. In an embodiment, the communication between the devices will coordinate the priority ordering of the devices that need to be charged. In an embodiment, the battery usage trends of the devices will be used to help notify a user when there is "enough" charge rather than a 100% charge notification as is currently provided by conventional charging techniques.

In an embodiment, the present principles, can provide prioritized charging based on the following relative factors between 2 or more mobile devices:

(1) the state of the battery (between the 2 or more devices), where a priority charge would be given to the lowest battery state;

(2) power settings of the device (screen on, brightness, volume, and so forth). These states indicate a higher power consumption, and therefore a need for a higher priority charge; and (3) running applications (streaming, maps, and so forth). These states indicate a higher power consumption, and therefore a need for a higher priority charge.

This would be usable for traditional charging as well as for new wireless charging methods that become available. When charging 2 or more devices, relative priority will be established between the devices based on (but not limited to), the criteria defined above. In the case of traditional charging, lower voltage would be applied to the lower priority devices, where higher voltage (within a threshold limit) would be applied to the higher priority devices. In the case of wireless charging, the same prioritization would occur and the wireless charge will be prioritized based on the applications that need it. This will allow for a prioritized charge based on relative state.

Another embodiment of the invention extends to laptop charging as well as USB device charges. For example, when plugging in a phone and a tablet to a laptop just for the purpose of transferring pictures or music and the phone is at 97% and the tablet is at 50%, the charge priority would be given to the tablet. This same logic would apply to USB charges as well as AC multiple plugged chargers.

Thus, the present principles advantageously provide priority charging based on the current state of mobile device (in particular running applications and anticipated rate of battery drain). Moreover, the present principles are advantageously applicable to both wired and wireless charging techniques. Further, such priority charging is facilitated by communication between the devices to be charged. In an embodiment, the devices advantageously communicate with each other to understand battery life and priority (charging) ordering of the devices. In an embodiment, the devices communicate and/or otherwise coordinate to user to tell the user when to charge another device as the current device being charged has "enough" charge, thus enabling a user to have all the user's devices at their minimum needed battery charge.

Figure 1:
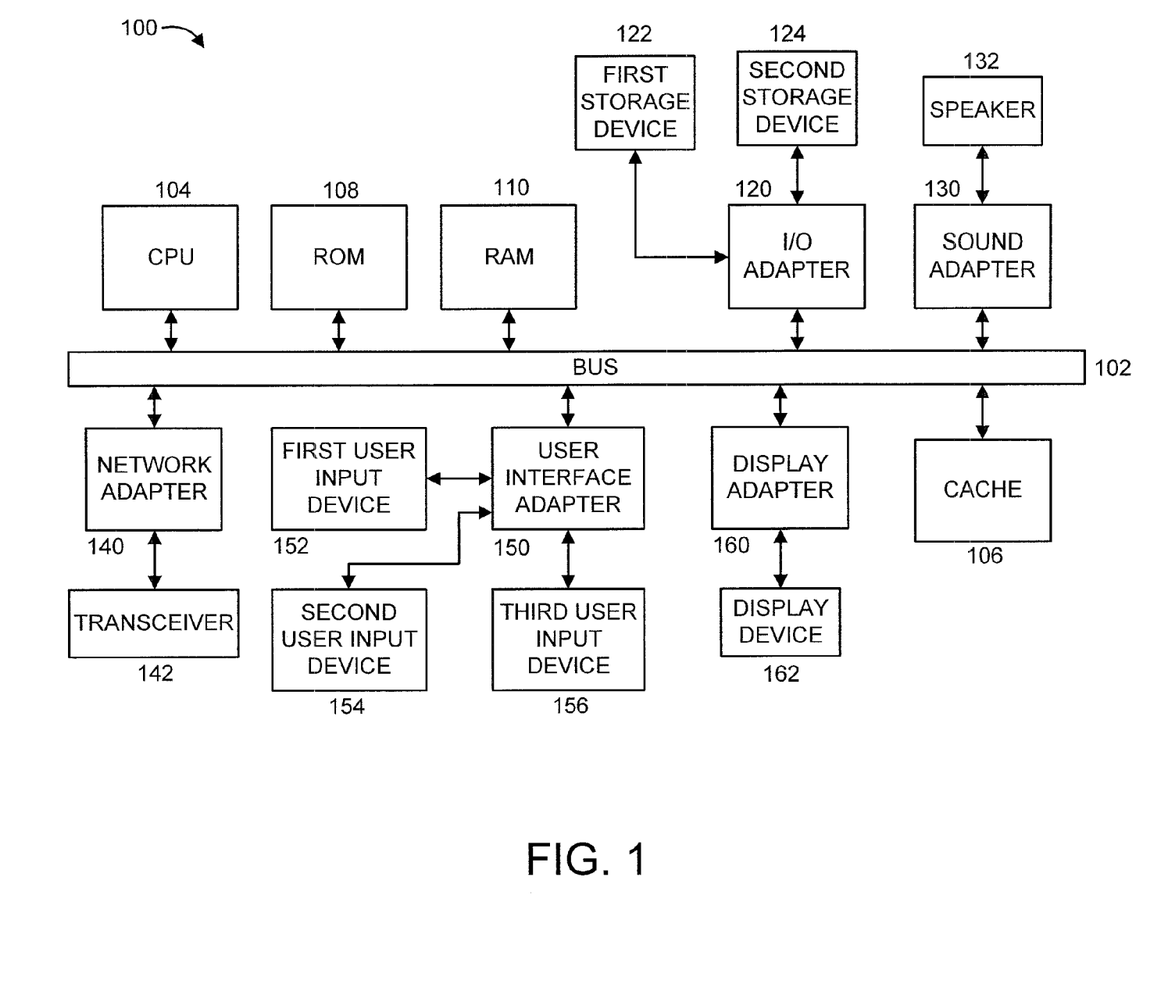
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
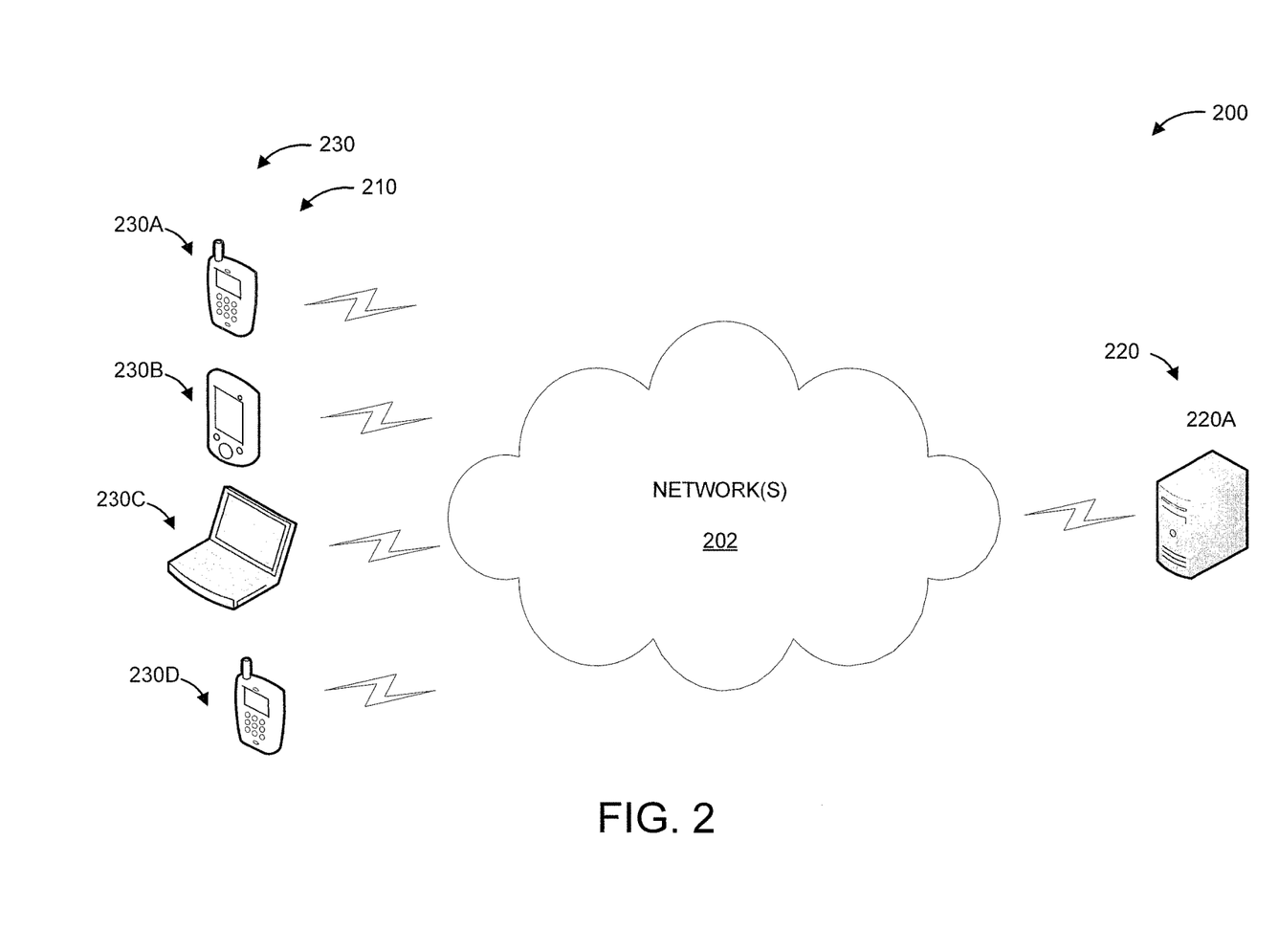
FIG. 2 shows an exemplary system 200 for prioritized charging of two or more mobile devices, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
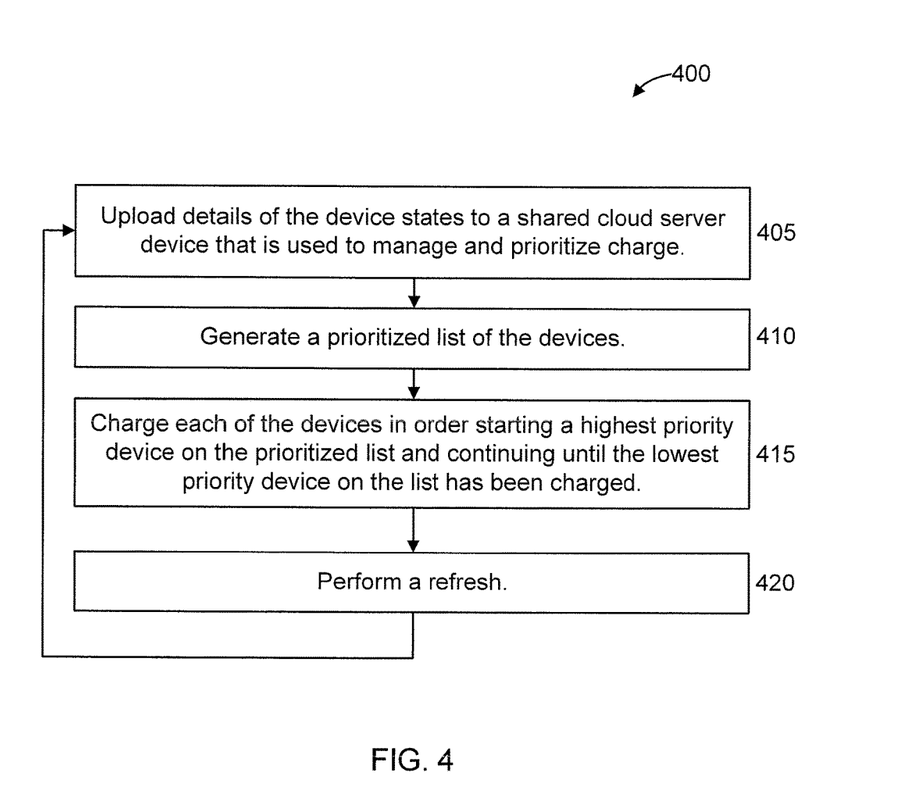
FIG. 4 shows an exemplary method 400 for prioritized charging of two or more mobile devices, in accordance with an embodiment of the present principles.
Figure 5:
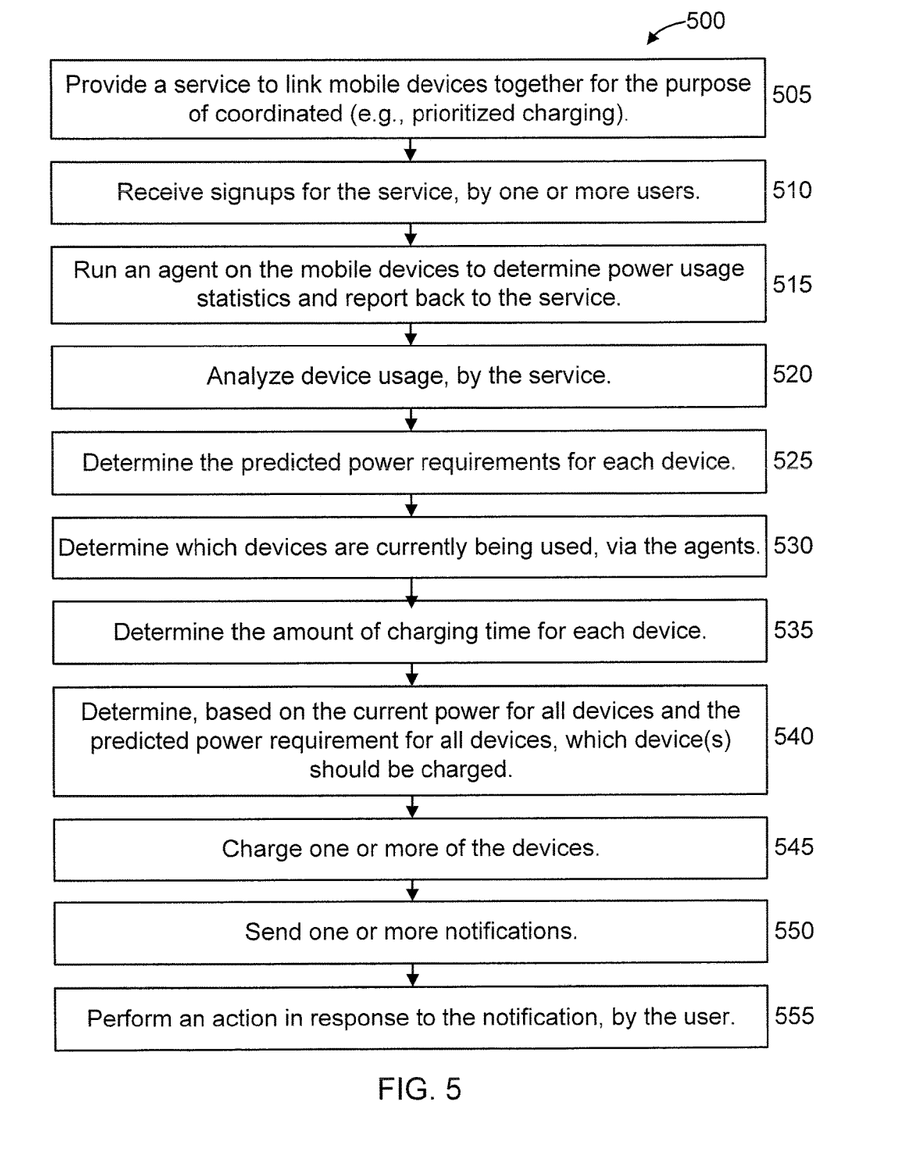
FIG. 5 shows another exemplary method 500 for prioritized charging of two or more mobile devices, in accordance with an embodiment of the present principles.

Further, it is to be appreciated that processing system 100 may perform at least part of the method described herein including, for example, at least part of method 400 of FIG. 4 and/or at least part of method 500 of FIG. 5. Similarly, part or all of system 200 may be used to perform at least part of method 400 of FIG. 4 and/or at least part of method 500 of FIG. 5.

FIG. 2 shows an exemplary system 200 for prioritized charging of two or more mobile devices, in accordance with an embodiment of the present principles.

The system 200 includes one or more agents 210, a charging manager 220, and a set of mobile devices (individually and collectively denoted by the reference numeral 230). The elements of system 200 can communicate through one or more networks 202.

In an embodiment, each mobile device 230 includes and/or is otherwise associated with a respective agent 210. In another embodiment, each mobile device 230 includes and/or is otherwise associated with a distributed agent.

Each of the agents 210 monitor power usage of the devices in the set 230. The agents 210 can be included in, or embodied as, any of an application, an application feature, and an operating system feature. Power usage information can include, but is not limited to, the current power of each device, the current rate of battery drain, historical battery usage data, power consuming settings (e.g., brightness, volume, and so forth), currently running applications, and so forth.

The charging manager 220 manages the charging of the set of mobile devices 230. In an embodiment, the charging manager 220 predicts power requirements for the devices in the set 230, and identifies a device charging order and a power threshold of each of the devices in the set 230. Moreover, the charging manager 220 monitors the power usage of the devices in the set 230 based on or through the agent 210. The power requirements can be predicted from power usage and other criteria including, but not limited to, historical battery data (e.g., historical battery drain data). In an embodiment, the charging manager 220 is part of a shared cloud server device 220A supporting the service. In an embodiment, the charging manager 220 manages a prioritized charging service as described in further detail herein.

The set of mobile devices 230 includes at least mobile devices 230A, 230B, 230C, and 230D. The set of mobile devices 230 can include any type of mobile device including, but not limited to, phones, tablets, laptops, media players, portable game systems, and so forth. The set of mobile devices 230 to which the present principles can be applied can be determined based on subscription to a service and/or proximity criteria.

Figure 3:
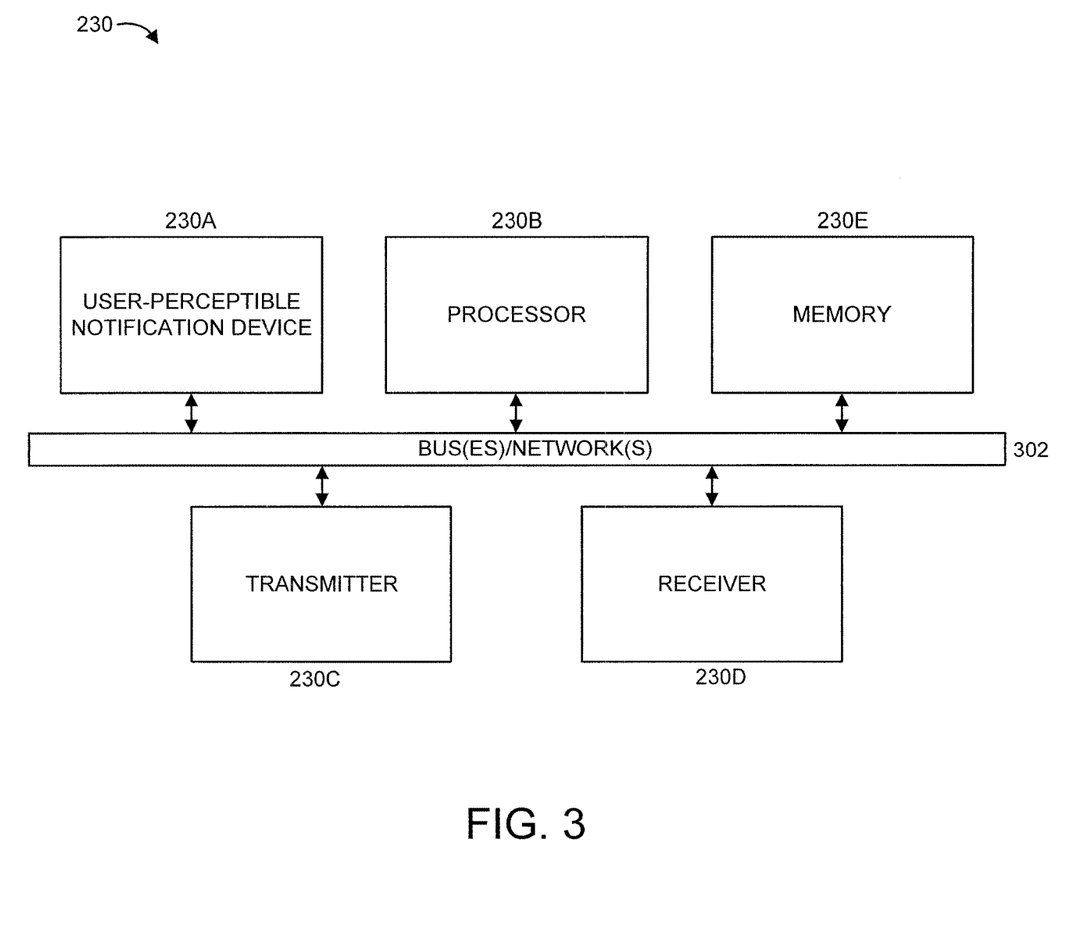
FIG. 3 further shows a mobile device 230, in accordance with an embodiment of the present principles.

FIG. 3 further shows a mobile device 230, in accordance with an embodiment of the present principles.

Each of the mobile devices 230 can include a user-perceptible notification device 230A for providing notifications to a user. The notifications can be provided from the service, through the charging manger, and/or from one or more other devices in the set 230. The user-perceptible notification device 230A can be, for example, a display, a speaker, and so forth. Each of the mobile devices 230 can further include a processor 230B, a transmitter 230C, a receiver 230D, and a memory 230E. Other elements included in the mobile devices in the set 230 are not shown or described for the sake of brevity, but are readily appreciated by one of ordinary skill in the art. In other embodiments, one or more of the mobile devices 230 include a transceiver in place of the transmitter 230C and receiver 230D.

In the embodiment shown in FIG. 3, the elements thereof are interconnected by a bus(es)/network(s) 302. However, in other embodiments, other types of connections can also be used. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of a mobile device are readily determined by one of ordinary skill in the art, given the teachings of the present principles provided herein, while maintaining the spirit of the present principles.

FIG. 4 shows an exemplary method 400 for prioritized charging of two or more mobile devices, in accordance with an embodiment of the present principles.

At step 405, upload details of the device states (battery, power settings, running applications, and so forth) to a shared cloud server device that is used to manage and prioritize charge. The shared cloud server device can use a customized refresh rate set by an administrator. The refresh rate could be for any time period, where thereafter reprioritization can be performed.

At step 410, generate a prioritized list of the devices.

At step 415, charge each of the devices in order starting a highest priority device on the prioritized list and continuing until the lowest priority device on the list has been charged.

At step 420, perform a refresh.

After step 420, the method returns to step 405 so that upon uploading the current details of the device states (at step 405), the priorities of the devices in the prioritized list may be change (at step 410), where the new priorities will govern the next charging session (at step 415).

FIG. 5 shows an exemplary another method 500 for prioritized charging of two or more mobile devices, in accordance with an embodiment of the present principles.

At step 505, provide a service to link mobile devices together for the purpose of coordinated (e.g., prioritized charging). In an embodiment, step 505 can involve providing an application for downloading to support the service and the device linking. The application can be downloaded, for example, from an application market place. In an embodiment, the application can be part of the operating system of the device.

At step 510, receive signups for the service, by one or more users. Each user has two or more mobile devices to be managed for charging in accordance with the present principles.

At step 515, run an agent on the mobile devices to determine power usage statistics and report back to the service. In an embodiment, the agent can be included with or as part of the application downloaded at step 505. In an embodiment, the agent is included in or as part of the operating system of the device. In an embodiment, the mobile devices to which the present principles are applied are determined based on, but not limited to, for example, registration to the service and/or a proximity criteria.

At step 520, analyze device usage, by the service. In an embodiment, the analysis can involve determining, for example, the current power % left for each device, the current rate of battery drain, and the historical battery drain. Of course, other parameters can be used, while maintaining the spirit of the present principles. The historical battery drain can be determined based on the currently open applications, similar date and/or time, and similar location. Of course, other items can be considered, while maintaining the spirit of the present principles.

At step 525, determine the predicted power requirements for each device. In an embodiment, step 525 is performed via the service (e.g., using a shared cloud server device supporting the service).

At step 530, determine which devices are currently being used, via the agents.

At step 535, determine the amount of charging time for each device. The charging time can be to a predicted power requirement (amount) or for full power.

At step 540, determine, based on the current power for all devices and the predicted power requirement for all devices, which device(s) should be charged. In an embodiment, the user is prompted to charge the device via a notification on the currently held device. For example, the user is carrying their phone but their tablet needs to be charged, so the system provides notification to the phone. In an embodiment, step 440 involves creating a prioritized list indicating an order in which the devices should be charged.

At step 545, charge one or more of the devices. In an embodiment, step 445 involves charging one or more of the devices in accordance with the prioritized list.

At step 550, send one or more notifications. For example, when one or more of the devices reach their predicted power requirement, a notification can be sent such as "device A has enough charge, time to charge Device B". The notification(s) can be sent to the other devices, other active devices, or just a selected device(s).

At step 555, perform an action in response to the notification, by the user. The user can, for example, perform any of the following: (1) charge the next suggested device; (2) snooze the notification; (3) tell the system to remind him/her when the device has reached full charge; and (4) turn of reminder and future ones till next device is charged. The system/service can thereafter have a response/reaction to the action performed by the user at step 555.

A description will now be given of various extensions to method 500, in accordance with an embodiment of the present principles.

In an embodiment, the user can specify if they want to overcharge each device by a certain % over the predicted amount.

In an embodiment, the user can override the predicted power requirement, for example, if they know the usage will be higher than typical.

A description will now be given of an exemplary scenario to which the present principles can be applied, in accordance with an embodiment of the present principles.

Lisa has 2 tablets for her kids and then both her husband and she have phones. The kid's typical usage is 6-8 AM 4-5:30 pm and then 7:30-8 PM. Lisa's usage is 7:30-8 AM, 12-12:30 PM, 5-5:30 PM, 10-11 PM. Her husband's usage is 8 AM-12 PM. Around 8 pm at night Lisa checks her system and sees the current % and predicted power requirement for each system, the system displays in a nice view something like the following:

| Device | Current % | Currently being used | Predicted power requirement for next usage | Predicted next time device will be used |
|---|---|---|---|---|
| Kids' tablet 1 | 10% | No | 25% | 6 AM |
| Kids' tablet 2 | 30% | No | 25% | 6 AM |
| Mom's phone | 25% | Yes | 15% | 7:30 AM |
| Dad's phone | 40% | No | 50% | 8:00 AM |

The system would determine kids' tablet 1 should be charged first, then dad's phone even though dad's phone has more of a charge than kids' tablet 2. Once kids' tablet 1 reaches 25% charge, it would send a notification to the other devices that it has enough charge to get through the next predicted usage.

A description will now be given of prioritized wired charging, in accordance with an embodiment of the present principles.

Two or more mobile devices are in need of charging. Details of the device states (battery, power settings, running applications, and so forth) are uploaded to a shared cloud server device that is used to manage and prioritize charging (customized refresh rate can be set by an administrator, for example, refresh list every 5 minutes (or other time period) and re-prioritize as needed). The information is sent by Bluetooth or other wireless technology to a charging device (e.g., a wall plug, and so forth).

A prioritized list is generated and charging (by virtue of a voltage split) is applied to the most needed device. Once a refresh occurs, priority may shift and subsequently, the charging may shift priorities.

A description will now be given of prioritized wireless charging, in accordance with an embodiment of the present principles.

Two or more mobile devices are in need of charging. Details of the device states (battery, power settings, running applications, and so forth) are uploaded to a shared cloud server device that is used to manage and prioritize charge (customized refresh rate can be set by an administrator, for example, refresh list every 5 minutes (or other time period) and re-prioritize as needed).

A prioritized list is generated and charge is applied to the most needed device through wireless charging methods. Once a refresh occurs, priority may shift and subsequently, the charging may shift priorities.

A description will now be given of another version of prioritized charging, in accordance with an embodiment of the present principles.

Two or more mobile devices are in need of charging. Details of the device states (battery, power settings, running applications, and so forth) are uploaded to a shared cloud server device that is used to manage and prioritize charge (customized refresh rate can be set by an administrator, for example, refresh list every 5 minutes (or other time period) and re-prioritize as needed).

A prioritized list is generated and charging is applied to the most needed (highest priority) device through computer, USB charger or AC adaptor. Once a refresh occurs, priority may shift and subsequently, the charging may shift priorities.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
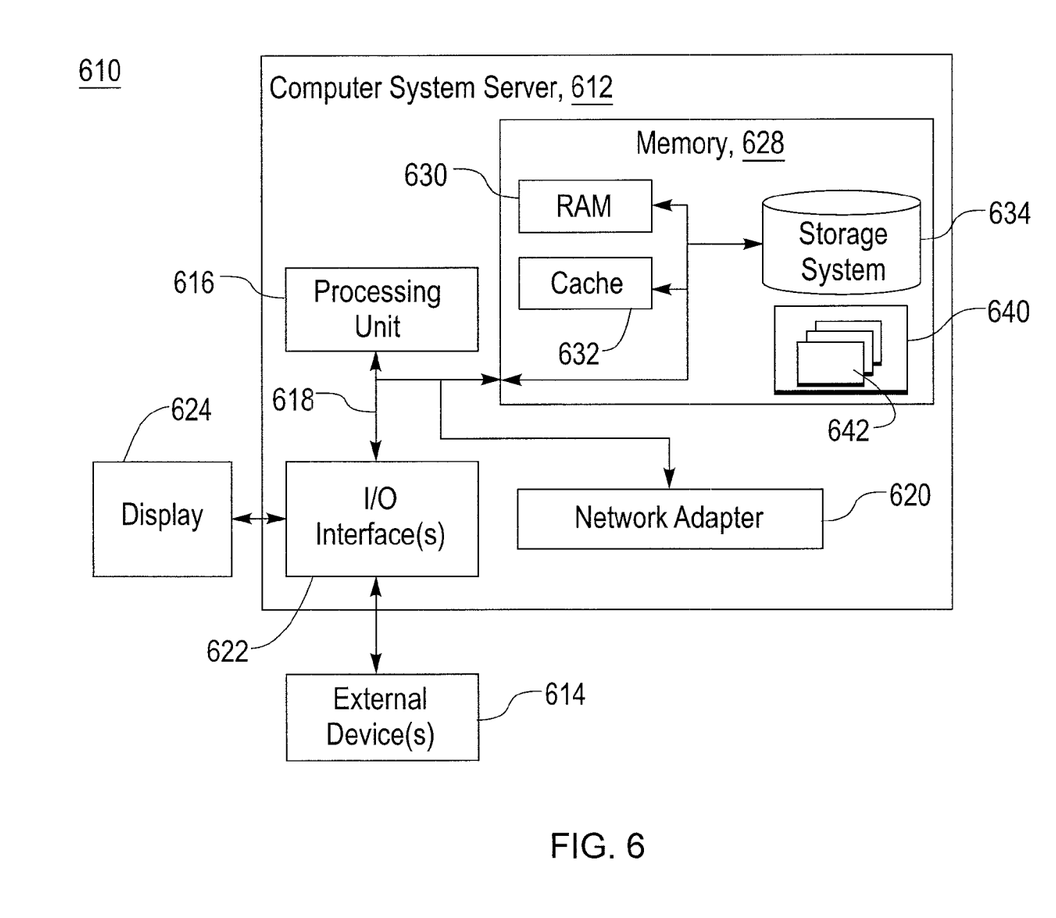
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
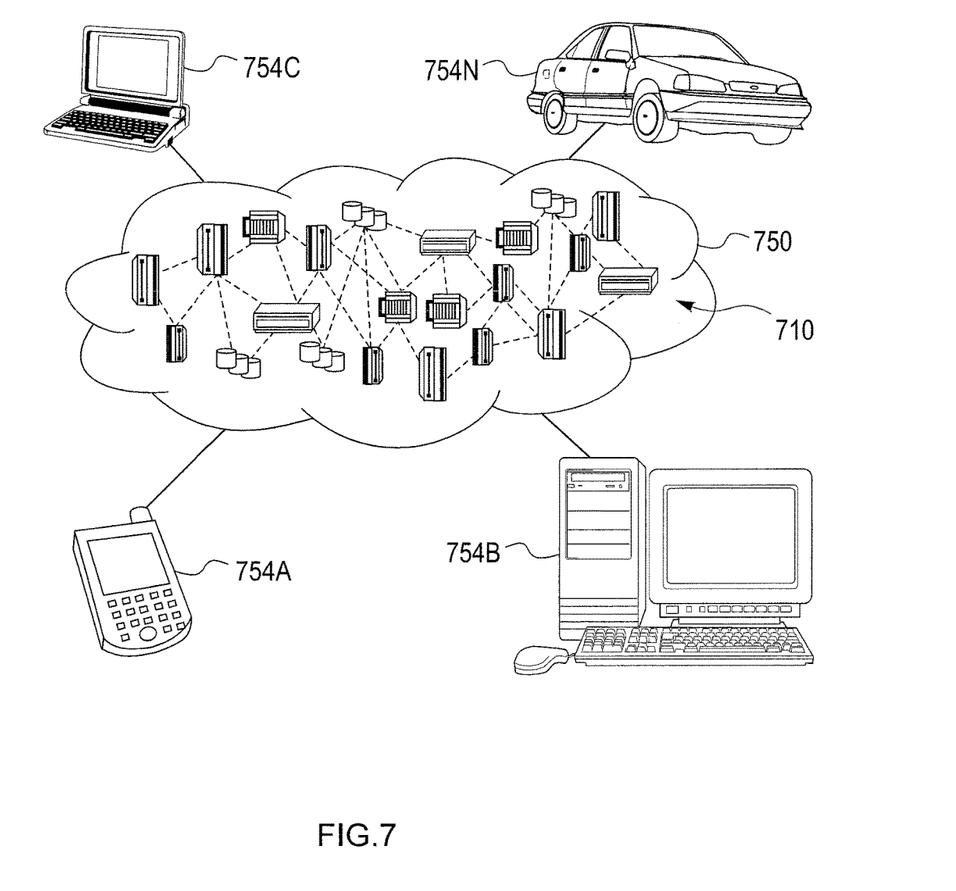
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
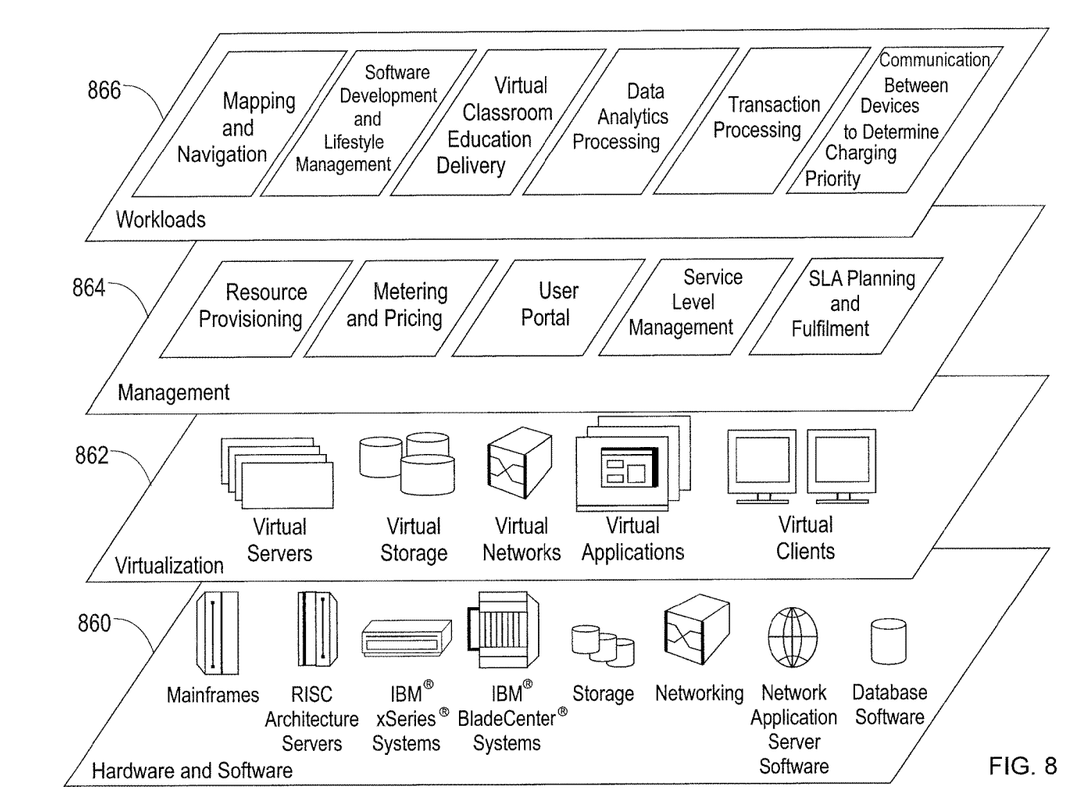
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and communication between devices to determine charging priority.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    monitoring power usage and predicting power requirements for at least two mobile devices;
    dynamically identifying a device charging order and a power threshold of each of the at least two devices to meet the predicted power requirements of each of the at least two devices; and
    notifying a user regarding the device charging order and the power threshold of each of the at least two devices, wherein at least said monitoring, identifying, and notifying steps are performed by a processor-enabled charging manager.

2. The method of claim 1, wherein the at least two devices are determined by a proximity criteria.

3. The method of claim 1, wherein the at least two devices are determined by a registration to a service.

4. The method of claim 3, wherein the service collects information for the power usage from the at least two devices and notifies a user of the device charging order and the powering threshold.

5. The method of claim 1, wherein a first device of the at least two devices notifies a second device of the at least two devices of the power requirements of the first device.

6. The method of claim 1, wherein the device charging order specifies the at least two devices in an order of a lowest charged device to a highest charged device in descending order of priority.

7. The method of claim 1, wherein the device charging order specifies the at least two devices in an order of a first to be charged to last to be charged in descending order of priority, based on the power usage and the predicted power requirement.

8. The method of claim 1, wherein the power requirements are predicted from past usage history.

9. The method of claim 1, further comprising exchanging communications between at the at least two devices specifying battery life information and the device charging order.

10. The method of claim 1, further comprising informing a user when to charge another one of the at least two devices when a current charging session for a given one of the at least two devices has ceased.

11. The method of claim 10, wherein the other one of the at least two devices is immediately after the given one of the at least two devices in the device charging order.

12. The method of claim 1, wherein monitoring the power usage comprises monitoring currently opened applications.

13. The method of claim 1, wherein the power threshold indicates at least one of a minimum charging time or a minimum charging amount.

14. The method of claim 1, wherein the device charging order and the power threshold are identified based on a user indication to overcharge at least one of the at least two devices by a specified amount.

15. A non-transitory article of manufacture tangibly embodying a computer readable program which when executed causes a computer to perform the steps of claim 1.

16. The method of claim 1, wherein said notifying step is performed by displaying a table that includes a device indicator and at least three items selected from the group consisting of a current percentage of charge, a current usage state, a predicted power requirement for next device usage, and a predicted next device usage time.

17. A system, comprising:
 a processor-enabled charging manager for monitoring power usage and predicting power requirements for at least two mobile devices, and dynamically identifying a device charging order and a power threshold of each of the at least two devices to meet the predicted power requirements of each of the at least two devices,
 wherein a user is notified regarding the device charging order and the power threshold of each of the at least two devices.

18. The system of claim 17, wherein the power threshold indicates at least one of a minimum charging time or a minimum charging amount.

19. The system of claim 17, wherein the device charging order and the power threshold are identified based on a user indication to overcharge at least one of the at least two devices by a specified amount.

20. The system of claim 17, wherein the processor-enabled charging manager is comprised in a shared cloud server device.

* * * * *